United States Patent [19]

Searle

[11] 4,350,914

[45] Sep. 21, 1982

[54] ELECTRIC MOTOR MANUFACTURE

[75] Inventor: Robert F. Searle, Amherst, N.H.

[73] Assignee: Vibrac Corporation, Amherst, N.H.

[21] Appl. No.: 159,134

[22] Filed: Jun. 13, 1980

Related U.S. Application Data

[60] Continuation of Ser. No. 972,780, Dec. 26, 1978, abandoned, which is a division of Ser. No. 825,207, Aug. 17, 1977, Pat. No. 4,182,026.

[51] Int. Cl.³ .............................................. H02K 19/26
[52] U.S. Cl. .................................. 310/194; 310/259; 310/43
[58] Field of Search ............... 310/254, 258, 259, 71, 310/42, 43, 194, 70 R

[56] References Cited

U.S. PATENT DOCUMENTS

| | | | |
|---|---|---|---|
| 2,575,705 | 11/1951 | Clokey | 310/258 |
| 2,607,816 | 8/1952 | Ryder et al. | 310/259 X |
| 2,687,483 | 8/1954 | Fry | 310/194 |
| 2,695,969 | 11/1954 | Yates | 310/43 |
| 3,041,487 | 6/1962 | Hurst | 310/259 |
| 3,180,267 | 4/1965 | Bemman et al. | 310/43 X |
| 4,039,875 | 8/1977 | Morreale | 310/194 |

Primary Examiner—Mark O. Budd
Attorney, Agent, or Firm—Schiller & Pandiscio

[57] ABSTRACT

The invention provides a new method of making electric motor stator assemblies of the type comprising a magnetic stator body with a plurality of discrete poles and a coil wound on each pole. Preferably each stator assembly is made by (a) providing a flexible chain of hollow bobbins with terminal pins for each bobbin; (b) inserting a magnetic pole piece in each bobbin in turn; (c) winding a coil on each bobbin and attaching the ends of each coil to the terminal pins of the bobbin on which the coil is wound; and (d) inserting at least a portion of the bobbin chain in a casing which engages and provides a low reluctance magnetic connection between the several pole pieces, whereby a stator assembly is formed which is characterized by (1) a stator in which the casing acts as the stator body and the pole pieces act as individual stator poles, and (2) individual coils each associated with one of the stator poles.

31 Claims, 10 Drawing Figures

ELECTRIC MOTOR MANUFACTURE

This is a continuation of Application Ser. No. 972,780 filed Dec. 26, 1978, now abandoned, (which is a division of Application Ser. No. 825,207 filed Aug. 17, 1977, now U.S. Pat. No. 4,182,026, issued Jan 8, 1980).

This invention relates to rotating dynamoelectric machines and more particularly to the manufacture of motors with distributed stator windings.

In d.c. motors a common type of stator with distributed windings consists of a cylindrical hollow stator body with a plurality of circumferentially-spaced internal poles and one or more excitation coils on each pole. The stator may be fabricated in laminated form to minimize eddy current losses. Such stators are commonly used in single phase and multiphase d.c. stepping motors of the type which use one or more cylindrical or disk-like rotors made of a suitable magnetic material and having pole-forming teeth or pole faces. The same type of stator can also be used in motors having permanent magnet rotors.

In such stepping motors the number of steps per revolution is determined by the number of poles on the rotor and stator and the number of excitation phases which are used. The number of teeth, or pole faces, on the rotor and the number of teeth, or pole faces, on the stator may but need not be different. For example a single stack (i.e., a single rotor and stator combination), three-phase motor with twelve stator teeth and eight rotor teeth provides 24 steps per shaft revolution, with each step being 15°. A large number of different rotor and stator teeth combinations have been contemplated for providing from between 12 to 200 steps per revolution, with in all cases the rotor and stator teeth being spaced symmetrically. In certain cases it is desirable for the stator and rotor to have the same number of teeth in order to obtain satisfactory torque.

A common method of fabricating stators of the type described and adapting them for use in a motor consists of a number of discrete operations, each consisting of one or more steps, as follows: (1) form stator laminations, (2) assemble a preselected number of laminations and bond them together in a stack with insulation therebetween, (3) wind coils on the stack, (4) apply terminations to the coils, (5) apply an end bell to the stator, (6) center bore the stack to provide a center bore of precise dimensions concentric with a shaft mount or hole in the end bell, (7) mount the foregoing structure to a rotor assembly consisting of a shaft which is inserted in the shaft mount of the end bell and a multi-pole rotor which extends into the center bore of the stator and is sized so that suitable air gaps are established between the stator poles and the rotor poles. The stator poles are usually pre-formed in the laminations, but may be formed after the stack has been assembled according to step (2).

The foregoing method has a number of limitations. In particular is the difficulty which is encountered in making motors capable of a large number of steps per revolution. The difficulty arises from the fact that the more the number of steps, the greater the number of stator poles required and hence the smaller the spacing between adjacent stator poles. As a result (unless the overall diameter of the stator is increased) the number of poles on the stator may be so great that little space is left to permit the placement of coils on those poles; hence completion of the stator assembly becomes quite difficult if not almost impossible. The foregoing method also is handicapped by the cost and difficulty of mounting the stator to the end bell and then machining the stator so that its center bore is precisely dimensioned and concentric with the shaft mounting hole in the end bell. Still other problems such as inability to provide coils of varying size and small end turns, high labor costs, high tooling costs, and limited adaptability for automation, are known to persons skilled in the art.

Therefore, a primary object of this invention is to provide a new and valuable method of manufacturing stators of the type described and more particularly to provide a method which overcomes or substantially reduces the problems and limitations of prior methods.

Another primary object is to provide a new and improved form of stator assembly for electric motors.

A further object is to provide a new electric motor construction which may be fabricated economically and is characterized by compactness, durability and reliability as well as other advantages obvious to persons skilled in the art.

Still another object is to provide a new and advantageous method of fabricating electric motors of the type comprising a stator assembly having a stator with a plurality of distributed poles and windings applied for the individual poles.

In accordance with this invention there is provided a molded flexible bobbin chain or strip comprising a series of hollow bobbins that are connected by one or more stringers and have terminal pins. A pole piece of a suitable low reluctance material is inserted in each bobbin and coils are wound on the bobbins after or before the pole pieces are inserted and connected to the terminal pins. The strip or a portion thereof of suitable length is inserted into a housing which interlocks with and provides a low reluctance connection among the pole pieces carried by the strip. The housing and pole pieces form a stator. Then in not necessarily the following order (a) the aforesaid terminal pins are coupled by suitable means to terminal leads and (b) the housing is filled with a potting compound at least partially surrounding the several bobbins and a boring operation is conducted to provide a precise center hole concentric with the housing and also to provide a circular curvature to the inner end faces of the pole pieces, whereby to assure a uniform gap between the pole pieces and the rotor which is mounted subsequently in the stator.

Other features and advantages of the invention are set forth in or rendered obvious by the following description read in conjunction with the accompanying drawings wherein like parts are identified by like numerals.

Figure 1:
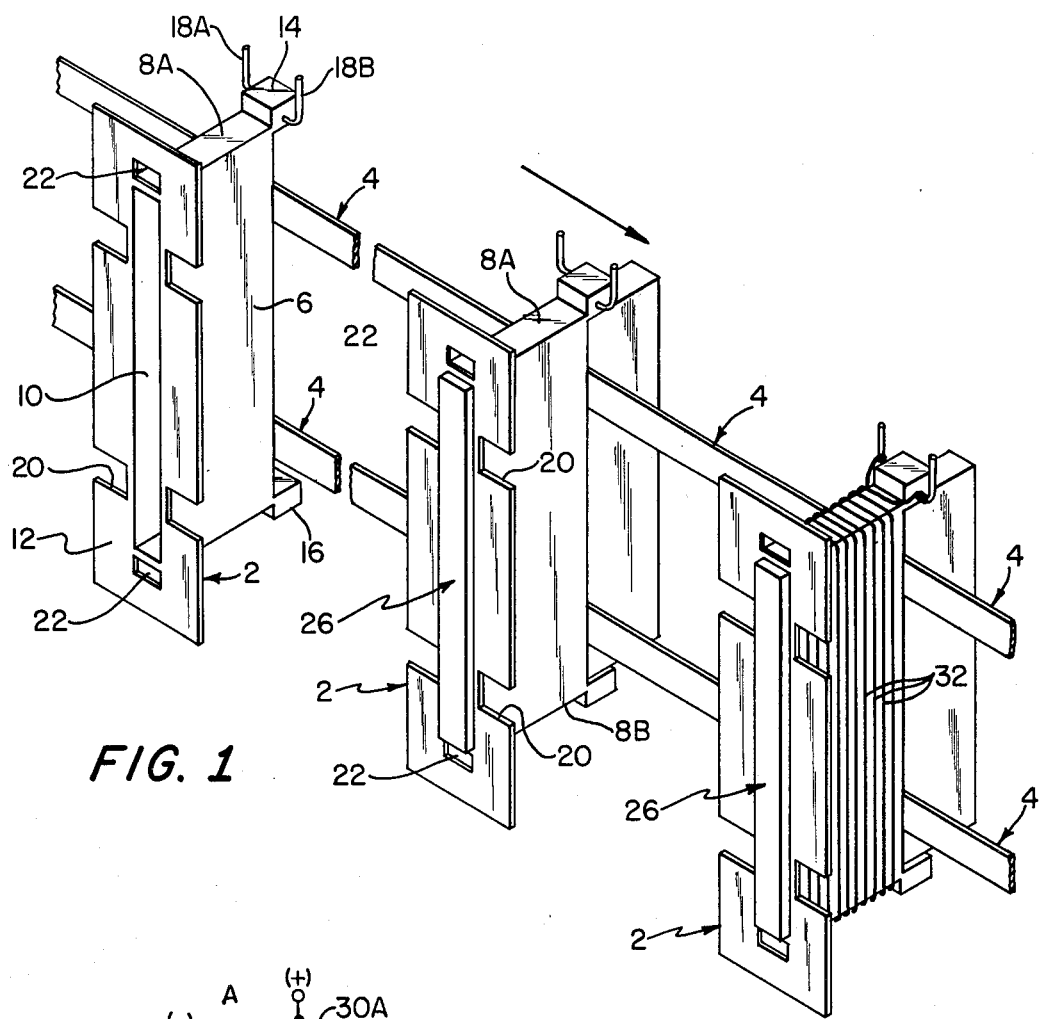
FIG. 1 is a perspective view on an enlarged scale of a bobbin chain provided in accordance with this invention.

Turning now to FIG. 1, the invention essentially involves providing a bobbin chain or strip comprising a plurality of bobbins 2 connected by at least one and preferably two or more stringers or links 4. The bobbins and links are molded of a suitable plastic electrically insulating material and preferably are provided as a continuous chain. As seen in FIG. 1, the preferred form of the bobbin chain comprises bobbins of essentially rectangular cross-section which are characterized by relatively long, essentially flat side surfaces 6, and relatively narrow essentially flat top and bottom surfaces 8 (A and B). Additionally each of the bobbins is formed with an elongate center hole 10 which has a rectangular cross-section as shown. The front end of each bobbin is further characterized by a flange 12 which extends beyond the top and bottom and the two vertically extending side surfaces of the bobbin as shown. The rear end of each bobbin is formed with an upper extension 14 and a lower extension 16. These extensions 14 and 16 cooperate with the upper and lower sections of the flanges 12 to form shoulders for confining windings of wire as hereinafter described. Each upper extension 14 is also formed with two terminal pins 18 (A and B) of a suitable conductive material such as copper or aluminum.

The chain shown in FIG. 1 is preferably formed by injection molding, with the upper extension 14 molded around pins 18A and 18B. Alternatively, pins 18A and 18B may be inserted into the chain after the chain has been molded. The chain is preferably made of a flexible plastic material such as nylon, polyethylene, polypropylene and the like. Although the flanges 12 are shown as having notches 20, it is to be appreciated that these notches are not essential. The flanges 12 are also shown as having apertures 22. These apertures are provided merely for the convenience of molding by injection techniques and are not necessary for the purposes of this invention.

Figure 2:
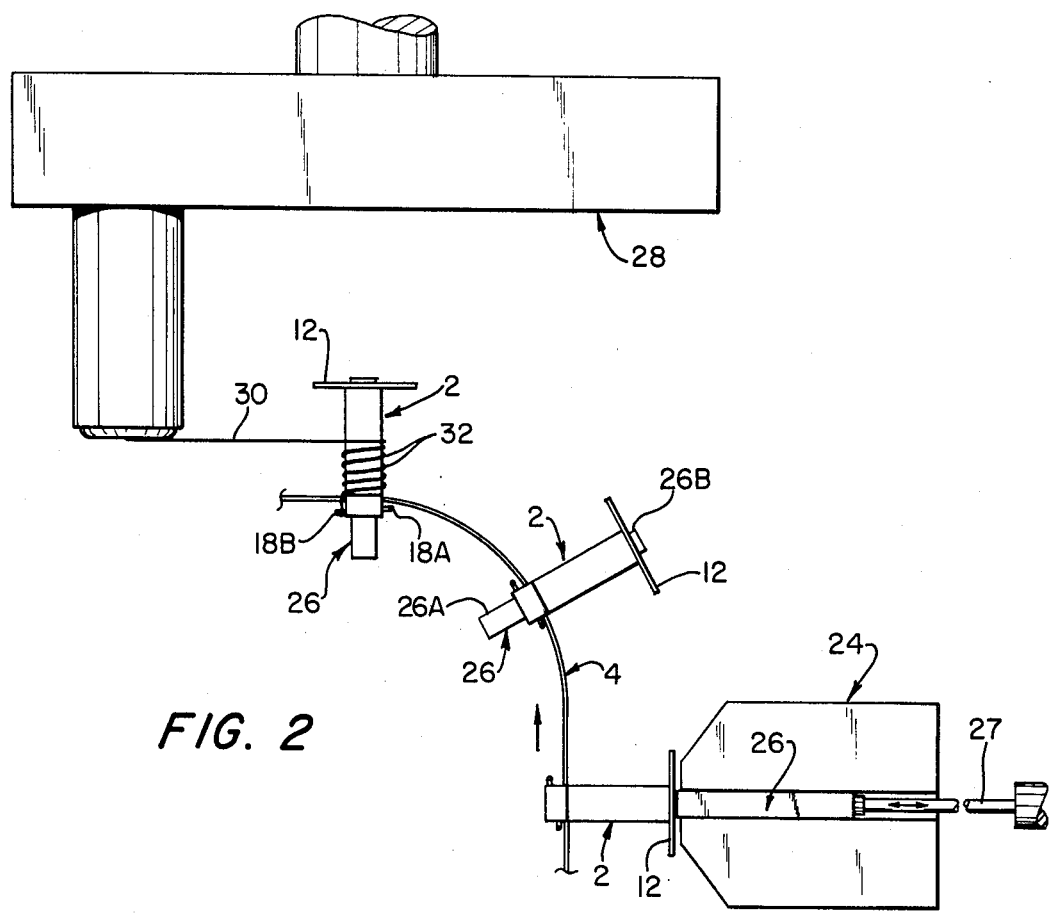
FIG. 2 is a plan view illustrating two of the steps of a preferred method of forming a stator assembly using a bobbin chain as shown in FIG. 1.

Referring now to FIG. 2, the bobbin chain of FIG. 1 may be used to produce stator assemblies by a method which preferably, but not necessarily, involves the use of a continuous bobbin chain, i.e. a bobbin chain of indefinite length. As shown in FIG. 2, the method of this invention comprises providing a continuous chain of bobbins constructed as shown in FIG. 1 and transporting the chains by suitable means (not shown) first through a pole piece inserting station where a suitable inserting mechanism 24 is used to insert pole pieces 26 sequentially into succeeding ones of the bobbins 2, and then through a winding station where a suitable winding machine 28 conducts a winding operation with respect to each bobbin. Each pole piece is made of a low reluctance material, e.g. silicon iron, and is formed with a rectangular configuration so as to be insertable into and make a snug fit with the hole 10 of a bobbin 2.

Preferably pole pieces 26 are sized so that they make a relatively tight or frictional engagement with the bobbins. Pole pieces 26 also are sized so that when they have been inserted into the bobbins they will protrude from both the front and rear ends of the bobbins, with the protrusion of the front ends 26A preferably being considerably greater than the protrusion of the rear ends 26B. The bobbin strip is moved intermittently, stopping at the inserting station 24 to receive a pole piece 26 and also stopping long enough at the winding station for coil winding machine 28 to wind a strand of insulated electrically conductive wire 30, e.g. wire of copper or aluminum around the bobbin so as to form a coil 32. Machine 28 is adapted to wind the wire 30 around one of the terminal pins 18 at the beginning of each coil winding operation and around the other of the two terminal pins at the end of the same coil winding operation, with the wire being severed at the end of each coil winding operation so that the bobbin strip is free to be advanced to replace the newly wound bobbin with the next empty bobbin. Alternatively the winding may be conducted without cutting the wire at the end of a coil winding operation, i.e. so that an integral section of wire 30 extends from the first-connected terminal pin of one bobbin to the last-connected terminal pin of the preceeding bobbin. These spanning sections of wire 30 may be cut off at a separate wire-cutting station downstream of the winding station.

The coil winding operation, with or without wire cutting at the end of each coil winding operation, may be carried out by conventional winding machines.

Additionally, the winding machine may be adapted to perform a welding or soldering operation for welding or soldering the wire to the respective terminal pins 18A and 18B. Preferably, however, the welding or soldering operation is conducted at a separate station downstream of the winding machine while the strip is stopped for a winding operation.

Figure 3:
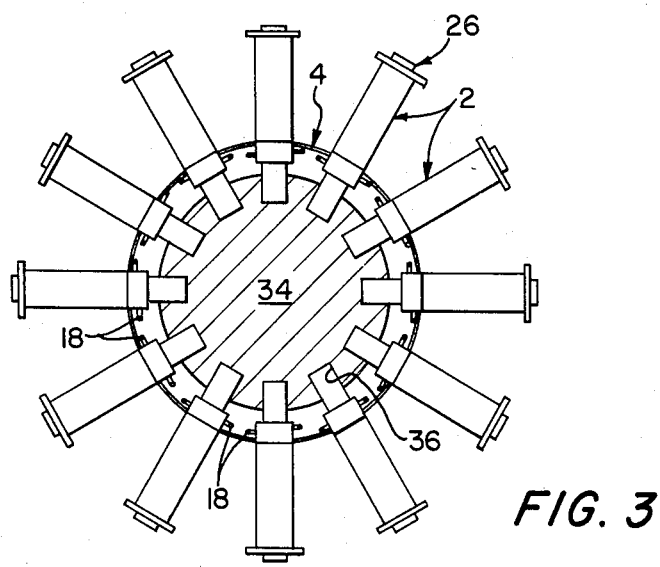
FIG. 3 is a cross-sectional view showing a subassembly comprising the bobbin chain with inserted pole pieces attached to a mandrel.

After the coil winding operation has been completed the bobbins are advanced serially to a cutting station (not shown) where the chain is cut into suitable lengths each comprising a predetermined number of bobbins as required for a particular stator construction, e.g. a length of 12 bobbins as shown in FIG. 3. Alternatively the bobbin chain may be initially provided in lengths each comprising a suitable number of bobbins, and each length may then be individually subject to the core insertion and coil winding operations previously described. In the latter case the number of bobbins in which the bobbin chain is supplied, may be exactly as required for a particular motor construction.

FIGS. 3–9 show how a severed length of twelve wound bobbins are used to form a twelve pole stator assembly and how that stator assembly is used to form a three-phase single stack step motor.

Turning now to FIG. 3, a chain of twelve bobbins, with pole pieces inserted and coils wound as previously described, is bent into a circular configuration and the inner ends of the pole pieces are inserted into grooves 36 formed in a cylindrical mandrel 34. Grooves 36 are sized to snugly receive the pole pieces. Preferably mandrel 34 is made of a magnetic material and is provided with means (not shown) for inducing a magnetic field therein at selected times, whereby to cause the pole pieces to be held to the mandrel by magnetic attraction. Thus, for example, the mandrel 34 may comprise a cylindrical extension of a member which is surrounded by an electrical coil and is connected to a suitable power supply for energizing the coil, whereby a magnetic field is induced in the mandrel 34 for the purposes previously described.

Figure 4:
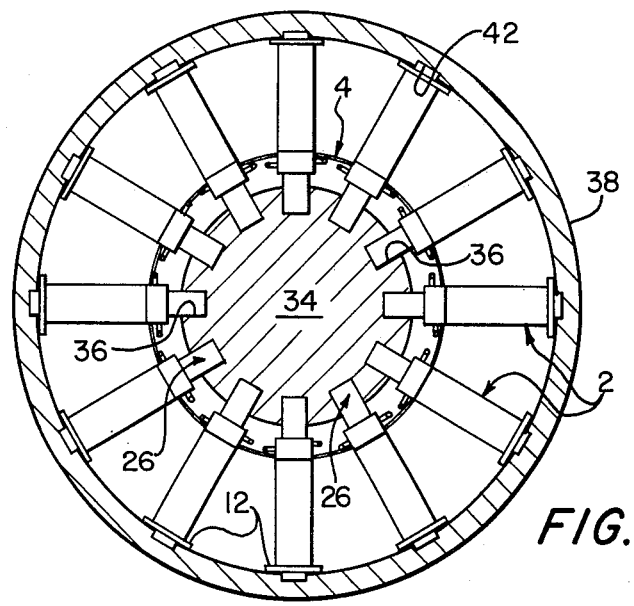
FIG. 4 is a view taken along line 4—4 of FIG. 5 but including the mandrel and showing how the subassembly of FIG. 3 is applied to a mating housing.
Figure 5:
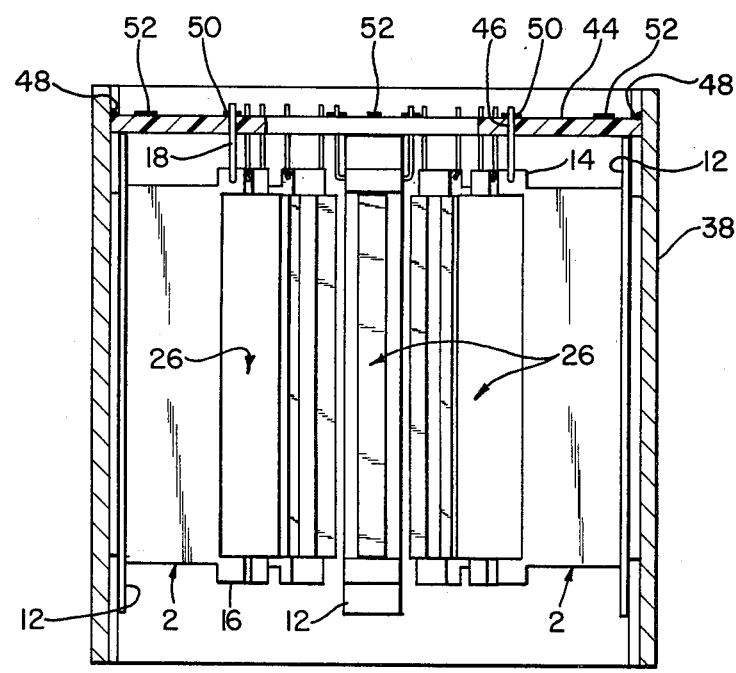
FIG. 5 is a vertical sectional view showing the assembly of FIG. 4, minus the mandrel, and a printed circuit board attached to the terminal pins.

After the pole pieces have been attached to the mandrel 34, the complete assemblage is combined with a cylindrical casing 38 as shown in FIG. 4. The casing 38 is made of a suitable low-reluctance material, e.g. silicon iron, or it may be made of a non-magnetic material such as brass or a plastic but have a suitable magnetic coating on its inner surface. In any event the casing 38 is formed with a plurality of grooves 42 for receiving the outer ends 26B of the pole pieces. The grooves 42 are identical in size and are uniformly spaced around the inner surface of casing 38, so that assemblage of pole pieces, wound bobbins, and mandrel may be inserted into the casing 38 by mechanical means (not shown) which automatically align the pole pieces with the grooves and cause them to slide into the latter rapidly and without damage. Grooves 42 are sized so as to make a tight fit with the pole pieces. For this purpose the edges of the pole pieces at their outer ends 26B may be bevelled to facilitate insertion of the pole pieces into grooves 42. After this insertion step, the mandrel is first demagnetized to release the pole pieces and then the mandrel withdrawn from casing 38. In this preferred mode of practicing the invention, the pole pieces are retained in grooves 42, as a result of their tight fit and also because of the connecting and restraining influence of the stringers 4. Thereafter, as shown in FIG. 5, 5, a printed circuit board 44 is inserted into the casing 38, with the upper end of the printed circuit board resting on the upper edges of bobbin flanges 12. The printed circuit board 44 is provided with holes 46 for accommodating the terminal pins 18A and 18B. The printed circuit board is provided with conductive members made of copper or the like in the form of a plurality of conductive lands 50 each surrounding one of the holes and each adapted to be soldered to the associated terminal pin 18, four terminal lands 52 for connecting the stator to a motor driver circuit, and additional conductive strips not shown interconnected with lands 50 and 52 so as to form a three-phase excitation circuit as hereinafter described. Further details of the construction of the printed circuit board are omitted since the invention is not limited to a specific board design and since a suitable construction is obvious to persons skilled in the art.

Figure 6:
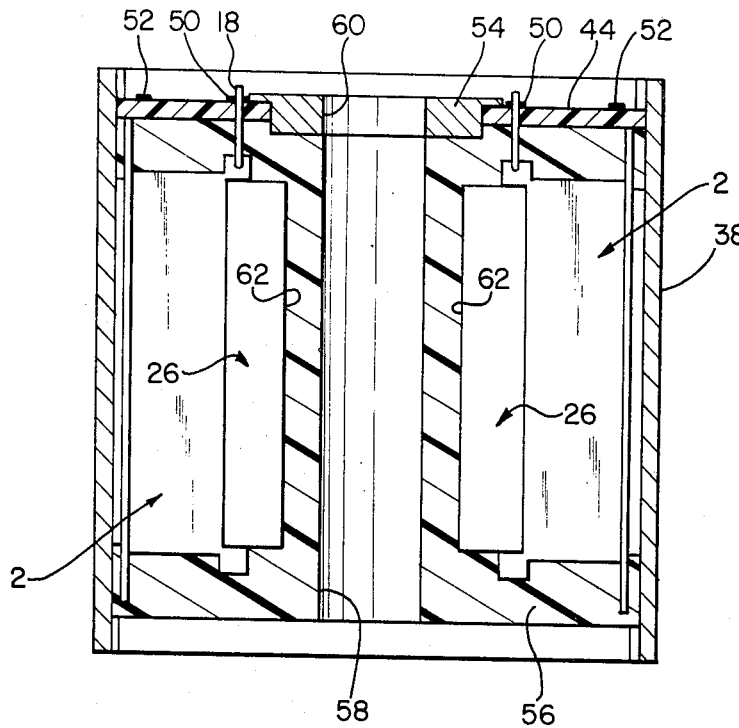
FIG. 6 is a vertical sectional view showing the assembly of FIG. 5 after the bobbin, printed circuit board and a bearing support have been potted in place.
Figure 7:
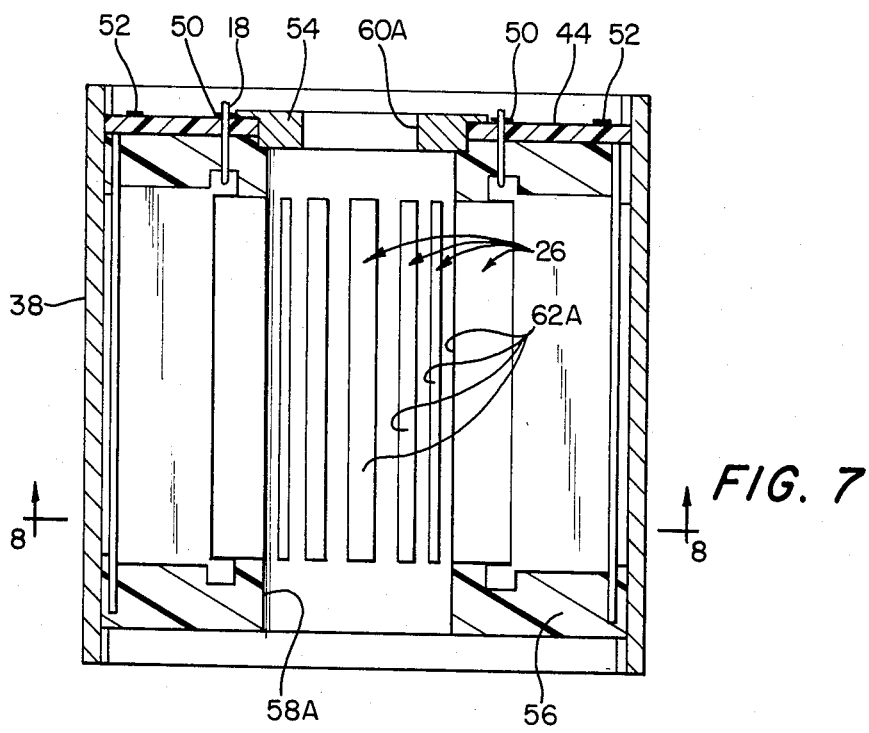
FIG. 7 shows the assembly of FIG. 6 after it has been machined to provide a rotor-receiving bore of precise dimensions.

Once this printed circuit board has been set in place, it is anchored to the casing for subsequent handling by means of a limited amount of a suitable insulating plastic potting compound, e.g. an epoxy resin as shown at 48. Alternatively the printed circuit board may be retained in place temporarily as a result of a friction fit with casing 38 or by suitable mechanical means. In any event, once the printed circuit board has been installed, the terminal pins 18 are welded, soldered or otherwise conductively connected to the appropriate lands 48 on the printed circuit board. Thereafter, as illustrated in FIG. 6, a bearing support annulus 54 is mounted into the center hole of printed circuit board 44 and plastic potting compound 56 is injected or otherwise introduced into the casing 38 and molded so as to form a cylindrical center hole 58 concentric with the aperture 60 in mounting annulus 54. Potting compound 56 may be any suitable material, e.g. an epoxy resin, and it is installed so as to make a firm bond with printed circuit board 44 and casing 38, as well as enveloping and covering the individual bobbins and the pole pieces 26. In this particular operation it is to be appreciated that the center hole 58 may have the same diameter as the diameter of a circle which is tangent to the flat inner faces 62 of the pole pieces. Preferably however, the diameter of hole 58 is smaller than the diameter of the circle which is tangent to the inner pole piece faces 62, as shown in FIG. 6.

After the potting compound 56 has been inserted and allowed to set, the subassembly is subjected to a machining operation wherein the center bore 58 is enlarged and machined precisely so as to provide a large center hole 58A (see FIG. 7) which is exactly concentric with the casing 38 and which is large enough so as to expose the inner end faces of pole pieces 26. More specifically the machine operation is conducted so that the center hole 60 of annulus 54 is converted to a larger hole 60A and simultaneously the inner faces 62 of the pole pieces are machined so as to have a circular curvature in cross-section concentric with the center hole. These curved faces of the pole pieces are identified by the numeral 62A in FIGS. 7 and 8.

Figure 8:
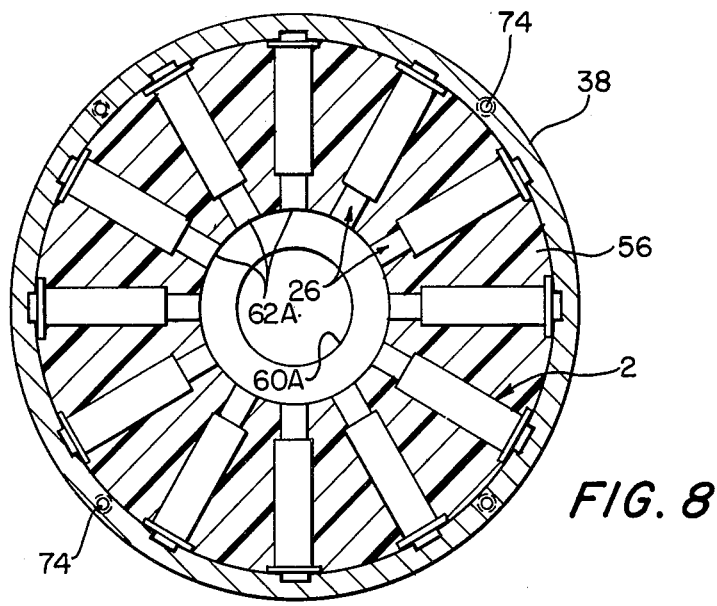
FIG. 8 is a cross-sectional view taken along line 8—8 of FIG. 7.
Figure 9:
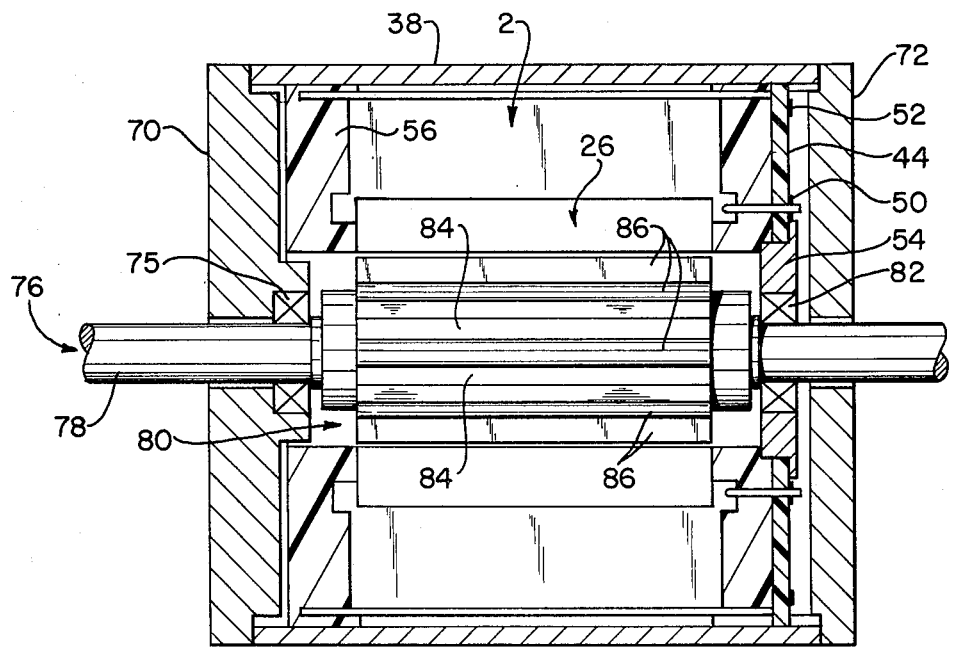
FIG. 9 is a longitudinal sectional view of a motor with the stator assembly of FIGS. 7 and 8.

After the machining operation has been completed, the resulting stator assembly is joined with a suitable rotor assembly so as to form a motor as shown in FIGS. 8 and 9. Terminal leads (not shown) for connecting the stator to a motor driver circuit preferably are connected to the lands 52 of the printed circuit terminal board as the initial step in forming the motor, but they may be applied to the printed circuit board before it has been inserted in the casing or as part of the soldering operation for connecting the p.c. board to terminal pins 18.

Referring now to FIGS. 8 and 9, for the purpose of making a motor, the ends of the casing are closed off by end members 70 and 72 which may be secured in place by suitable means, e.g. by screws (not shown) that pass through holes in the end members and are received in threaded openings provided in the ends of the casing as shown at 74. End cap 70 is provided with a bearing 75 for journaling the shaft 78 of a rotor assembly 76 which further includes a rotor 80. The opposite end of shaft 78 is mounted in a bearing 82 which is secured to the annulus 54 previously described and extends through the opposite end plate 64. The rotor 80 shown in FIG. 9 is of the cylindrical type, being made of a suitable material of low reluctance and being formed with a series of axially-extending, circumferentially and evenly spaced slots 84 so as to form a plurality of rotor poles 86. Rotor 80 is substantially coextensive lengthwise with pole pieces 26, as seen in FIG. 9. Although not shown, it is to be understood that the terminal leads (not shown) for connecting the motor to its driver circuits (also not shown) may extend through the side wall of the casing 38 or through the end cap 72.

Figure 10:
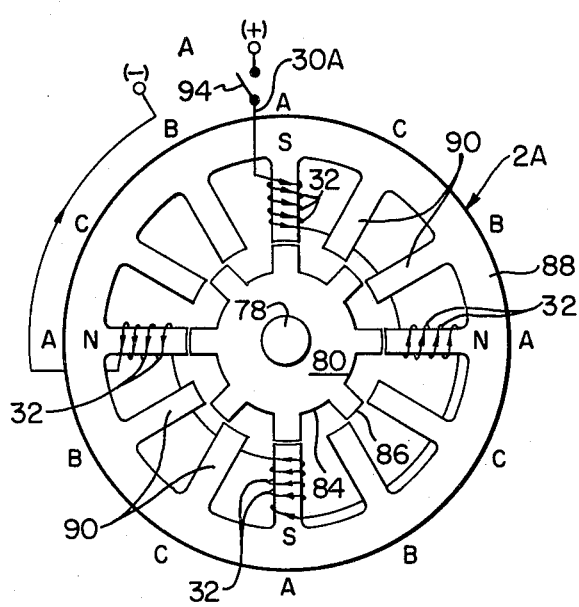
FIG. 10 is a schematic representation of one of the energizing phases of the stator assembly of the motor of FIG. 9.

FIG. 10 illustrates the relationship between the stator and rotor assemblies of the motor of FIG. 9. As shown in FIG. 10 the stator assembly 2A comprises a stator body 88 which constitutes the casing 38 and twelve poles 90 which are formed by the pole pieces 26, plus the rotor 80 which has eight discrete poles 86. For convenience windings 32 are shown on only four of the stator poles, but it is to be understood that each stator pole has its own winding as previously described. To better correlate the relationship of the stator poles and coils for three phase operation, each stator pole is designated A, B or C. Also for convenience, the four "A phase" coils 32 are represented as being turns of a common conductor 30A which is connected at one end via switch 94 to the positive terminal of a d.c. power supply and at the opposite end to the negative terminal of the same d.c. power supply. The "A phase" windings are associated with the first, fourth, seventh and tenth poles of the stator, with the windings on the first and seventh poles being identical and opposite to the windings on the fourth and tenth poles. Hence when conductor 30A is energized as shown, magnetic fields will be induced in those four poles with the inner ends of the first and seventh pole pieces becoming south magnetic poles and the corresponding ends of the fourth and tenth pole pieces becoming north magnetic poles. The circular stator body provides a return path for the magnetic flux between the first and fourth pole pieces and also between the seventh and tenth pole pieces. Although not shown, it is to be understood that the two additional conductors are wound in the same way about the B and C poles respectively to provide the two other phases of operation. More specifically, the B phase conductor is wound in the same manner as conductor 30A about the second, fifth, eighth and eleventh pole pieces, while the C-phase conductor is wound in the same fashion about the third, sixth, ninth and twelvth pole pieces. In actuality, of course, the three-phase stator circuits are achieved by suitably connecting the individual coils 32 to the p.c. board via terminal pins 18, and by connecting the terminal leads (not shown) attached to the p.c. board lands 52 to a d.c. power supply via suitable motor driver circuits (not shown) which comprise commutating means, represented by switch 94, for achieving three phase operation.

It is to be understood that the method described in connection with FIGS. 1-9 is the preferred mode of practicing Applicant's invention and that the method may be varied without departing from the principles of the present invention. Thus, for example, it is contemplated that the core pieces could be inserted into the bobbins after the coils have been wound on the bobbins, i.e., the stations 24 and 28 could be encountered in the reverse order. However, if the pole pieces are inserted after the windings have been applied, care must be taken to fabricate the bobbins of a material which is sufficiently stiff to avoid becoming compressed by wire 30 as the latter is being wound thereon; otherwise the winding of the wire might so compress the bobbin as to prevent the pole pieces 26 from being easily installed into the bobbins. It is also contemplated that the connections of the terminal pins to the printed circuit boards could be made after the bobbins have been enveloped in the potting material 48. It is also contemplated that the bobbin chain could be used advantageously by wrapping the bobbin around mandrel 34 so that the outer ends 26B of the pole pieces were positioned in grooves 36 of the mandrel 34, whereby the front ends 26A of the pole pieces would be engaged with the grooves in the casing 38. In such a reversal of parts, the terminal pins 18A and 18B would be located closer to the casing 38, in which case the conductive elements of the printed circuit board would have to be modified so as to suitably connect terminal pins 18A and 18B for the desired three-phase operation. It is also understood that the dimensions of the flanges 12 and also of the extensions 14 and 16 could be modified in the event that the bobbins were wound in such reverse fashion.

The method also may be practiced by making the mandrel 34 so that releasable mechanical means are employed for holding the pole pieces in grooves 36 until the pole pieces have been inserted into the grooves 42 of the casing. It is also contemplated that the mandrel could be hollow and collapsable when it is desired to engage it from the pole pieces assembled in the casing 38.

A further modification of the method is to make the grooves 42 slightly oversized with respect to the pole pieces, and to use mechanical means, e.g. snap rings, for locking the pole pieces in the casing. For this modification, the pole pieces could be provided with notched ends for engagement by the snap rings, with the latter also residing in peripheral grooves formed in the casing. Still other means of retaining the pole pieces in the casing 38 preparatory to injecting the potting compound also may be used.

It is also contemplated that the printed circuit board may be omitted and replaced by a plurality of individual insulated wires each connected to a separate terminal pin 18A and 18B. Such wires may be provided in the form of a harness to facilitate bringing the wires out through the casing or end member of the motor.

It is also considered that the mandrel may be retained in place within the casing 38 until after the potting compound has been injected. This modification offers the advantage that the mandrel supports the pole pieces and holds them tightly against the casing 38. A further advantage of this modification is that it avoids having the inner end faces of the pole pieces covered by the potting compound. Of course, the inner end faces of the pole pieces could be initially formed with curved end surfaces, thereby eliminating the need for machining the surfaces to insure adequate clearance between the pole pieces and the rotor. Preforming the pole pieces in this manner is particularly advantageous where the mandrel is kept in engagement with the pole pieces until after the potting compound has been injected.

While the invention has been described in connection with a single stack, three-phase motor, it is to be understood that the invention is also applicable to the production of motors designed for operation according to a different number of phases, e.g. a five-phase motor, and also motors consisting of more than a single stack of stators and rotors.

A further modification and advantage of the invention resides in the fact that the stator may be formed in two symmetric halves, each half consisting of two or more bobbins which have been wound and have had pole pieces installed as described above. A further modification contemplated is to employ potting materials so that the material does not envelope the bobbins but merely anchors the bobbins at one or both ends to the casing. However, it is preferred for the potting material to surround the bobbins since it helps provide dimensional stability to the stator. Additionally, the potting compound may include selected filler materials adapted to facilitate the dissipation of heat from the motor interior to the casing. A further possible modification of the invention involves using a permanent magnet rotor, e.g. a rotor with a plurality of permanent magnets distributed around its axis.

The advantages of the invention are believed to be quite numerous. For one thing, the cost of manufacturing stators is believed to be substantially reduced, particularly since the automated winding may be achieved by readily available equipment and automatic pole-piece insertion is well within the skill of the art. A further advantage is that the number of turns applied to each bobbin is not determined initially by the spacing between the bobbins after the bobbins have been inserted into the casing, and therefore, winding may be achieved by conventional winding machinery. A further advantage resides in the fact that the shape of the bobbins may be arranged so as to provide for relatively short end turns, as in the coils wound on bobbins 2 in FIG. 1. In this connection it is to be noted that the upper and lower end surfaces 8 of the bobbins are relatively narrow, thereby assuring relatively short end turns and thereby avoiding consequential electrical losses. Still another advantage resides in the fact that the windings on the individual bobbins may be varied, so that the number of turns adjacent to flanges 12 may be greater than the number of turns at the opposite end of the bobbin. This winding technique also helps reduce electrical losses. A further advantage of the invention resides in the fact that the width of the flanges 12 can be adjusted so that the flanges will automatically help align the array of bobbins when the bobbins are inserted into the casing 38. Additionally the flanges may be made relatively thin, or made of a material which is somewhat more flexible than the bobbins per se, whereby the flanges may be able to bend and assume a contour corresponding to the curvature of the inner surface of the casing 38 when the array of bobbins is installed in the casing. Still another advantage of the invention resides in the fact that the stator assembly may be used with different types of rotors, e.g. a permanent magnet rotor. It is also possible for stators constructed in accordance with the present invention to be used in disk-type motors.

Still other advantages will be obvious to persons skilled in the art.

What is claimed is:

1. A stator assembly for an electric motor comprising:
a housing with a plurality of slots;
an array of pole pieces of magnetic material disposed within said housing in said slots;
a plurality of bobbins connected by integral stringer means, each bobbin surrounding one of said pole pieces;
a plurality of coils each surrounding one of said bobbins;
terminal means connected to said coils for coupling said coils to a source of electrical power; and
means for holding said pole pieces fixed to said housing;
said housing being adapted to provide a low reluctance path between said pole pieces.

2. A stator assembly according to claim 1 wherein said housing is made of a magnetic material.

3. A stator assembly according to claim 1 wherein said slots are in the form of grooves extending longitudinally of said housing.

4. A stator assembly according to claim 3 wherein said housing is cylindrical.

5. A stator assembly according to claim 1 wherein said means for holding said pole pieces fixed to said housing comprises an electrical insulating material at least partially surrounding said bobbins and securing said bobbins to said housing.

6. A stator assembly according to claim 5 wherein said pole pieces converge toward the center of said housing and have inner end faces that are equidistant from the center of said housing and are exposed to one another.

7. A stator assembly according to claim 6 wherein said electrical insulating material has an inner surface that defines a center bore, and said inner end faces of said pole pieces are flush with said inner surface.

8. A stator assembly according to claim 1 wherein said bobbins have inner and outer ends with said outer ends being closer to said housing than said inner ends, and further wherein said bobbins have flanges at their outer ends and said stringers are closer to said inner ends than said outer ends.

9. A stator assembly according to claim 1 wherein said bobbins are relatively large lengthwise of said housing and relatively small cross-wise of said housing.

10. A stator assembly according to claim 1 further including a printed circuit board mounted to said housing, said printed circuit board having fixed conductive elements connected to said terminal means and means for connecting electric power from an exterior source to said fixed conductive elements.

11. A stator assembly according to claim 10 wherein said housing is cylindrical, and further including a hole in said printed circuit board concentric with said housing, and a bearing support concentric with said hole.

12. A stator assembly according to claim 1 wherein said slots are formed on the inner surface of said housing.

13. In an electric motor of the type comprising a stator assembly having distributed windings, a rotor assembly, and means rotatably supporting said rotor assembly within said stator assembly;
an improved stator assembly comprising:
a casing of magnetic material having a plurality of internal slots, a plurality of magnetic pole pieces disposed within said casing in said slots, a plurality of bobbins of electrical insulating material with each bobbin surrounding one of said pole pieces and being connected to at least one other bobbin by at least one stringer, coils wound around said bobbins, terminal means connected to said coils for coupling said coils to a source of electrical power, and means holding said pole pieces, bobbins and coils fixed to said casing, said pole pieces having inner end faces disposed in a circular array about and lying close to a rotor portion of said rotor assembly.

14. An electric motor according to claim 13 further including a printed circuit terminal board disposed within said casing and connected to said terminal means.

15. An electric motor according to claim 13 further including end means closing off opposite ends of said casing, and further wherein said rotor assembly comprises a magnetically responsive rotor surrounded by and spaced from said pole pieces and a shaft attached to said rotor, at least one end of said shaft being rotatably supported by and protruding through one of said end means.

16. An electric motor according to claim 13 wherein said rotor comprises a plurality of permanent magnets.

17. A stator assembly for an electric motor comprising:
a housing;
an array of hollow bobbins disposed within said housing and connected together by integral stringer means;
coils surrounding said bobbins;
a plurality of pole pieces of magnetic material with each pole piece disposed within and projecting out of both ends of one of said bobbins;
terminal means connected to said coils for coupling said coils to a source of electric power; and means for holding said bobbins and said pole pieces fixed to said housing;

said housing being adapted to provide a low reluctance path between said pole pieces.

18. A stator according to claim 17 wherein said bobbins and pole pieces are arranged in circular arrays.

19. A stator assembly according to claim 17 wherein said housing is cylindrical.

20. A stator assembly according to claim 17 wherein said means for holding said bobbins fixed to said housing comprises an electrical insulating material at least partially surrounding said bobbins.

21. A stator assembly according to claim 20 wherein said electrical insulating material has an inner surface that defines a center bore, and said pole pieces have inner ends that are flush with said inner surfice.

22. A stator assembly for an electric motor comprising:

a housing;

an array of hollow plastic bobbins disposed within and secured to said housing, each of said bobbins being connected to at least one other bobbin by at least one integral stringer;

a plurality of pole pieces of magnetic material formed as discrete elements separate from said housing and bobbins, each pole piece being disposed within a bobbin, each pole piece having an inner end projecting from a corresponding end of the bobbin in which it is disposed, said inner ends terminating in end faces;

coils surrounding said bobbins;

terminal means connected to said coils for coupling said coils to a source of electrical power, said terminal means comprising pins secured to said bobbins; and an electrical insulating material surrounding and bonded to said bobbins and coils and at least part of each pole piece, said electrical insulating material having an inner surface that defines a circular bore and is flush with said end faces of said pole pieces;

said housing being adapted to provide a low reluctance path between said pole pieces.

23. A stator assembly according to claim 22 wherein said pole pieces are rectangular and said bobbins have rectangular holes for receiving said pole pieces.

24. A stator assembly according to claim 22 wherein said end faces of said pole pieces are circularly curved.

25. A stator assembly according to claim 22 further including a printed circuit board mounted to said housing, said printed circuit board having fixed conductive elements connected to said terminal means and means for connecting electric power from an exterior source to fixed conductive elements.

26. A stator assembly according to claim 22 wherein said pins are embedded in said bobbins.

27. A stator assembly according to claim 26 wherein said bobbins have first and second ends disposed nearer and further respectively from said bore, and further wherein said pins are located at said first ends.

28. A stator assembly according to claim 27 wherein the inner surface of said housing is cylindrical, said bobbins are arranged symmetrically about said bore, and said bobbins and pole pieces are secured to said housing by said electrical insulating material.

29. A stator assembly according to claim 28 further including slots formed on the inner surface of said housing, and further wherein said pole pieces extend into said slots.

30. A stator assembly according to claim 29 wherein said electrical insulating material surrounds and is bonded to at least part of the inner end of each pole piece.

31. A stator assembly according to claim 22 wherein said pole pieces are secured to said housing by said electrical insulating material.

* * * * *